(12) United States Patent
Roehm (10) Patent No.: US 9,248,507 B2
(45) Date of Patent: Feb. 2, 2016

(54) HAND-HELD POWER TOOL

(75) Inventor: Heiko Roehm, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 1112 days.

(21) Appl. No.: 12/919,866

(22) PCT Filed: Dec. 9, 2008

(86) PCT No.: PCT/EP2008/067065
§ 371 (c)(1),
(2), (4) Date: Aug. 27, 2010

(87) PCT Pub. No.: WO2009/106178
PCT Pub. Date: Sep. 3, 2009

(65) Prior Publication Data
US 2011/0000692 A1    Jan. 6, 2011

(30) Foreign Application Priority Data
Feb. 29, 2008  (DE) .......................... 10 2008 000 470

(51) Int. Cl.
*B23B 31/165* (2006.01)
*B23B 31/12* (2006.01)
*B23B 31/00* (2006.01)

(52) U.S. Cl.
CPC ........... *B23B 31/1238* (2013.01); *B23B 31/008* (2013.01); *B23B 31/1207* (2013.01); *B23B 2231/38* (2013.01); *Y10T 279/17615* (2015.01); *Y10T 279/17623* (2015.01); *Y10T 279/17632* (2015.01); *Y10T 279/17649* (2015.01); *Y10T 279/34* (2015.01)

(58) Field of Classification Search
CPC ............ B23B 2231/38; B23B 31/1207; B23B 31/1238; Y10T 279/17615; Y10T 279/17623; Y10T 279/17632; Y10T 279/17649
USPC ........ 408/240; 279/60, 61, 62, 63, 64, 65, 66, 279/902, 140
See application file for complete search history.

(56) References Cited

U.S. PATENT DOCUMENTS

| 4,103,914 | A | * | 8/1978 | Rohm ........................ 279/4.07 |
| 4,682,918 | A | * | 7/1987 | Palm ......................... 408/241 R |
| 4,951,955 | A | * | 8/1990 | Sakamaki ...................... 279/62 |
| 5,125,673 | A |   | 6/1992 | Huff et al. |
| 5,732,956 | A | * | 3/1998 | Huff et al. ....................... 279/62 |
| 5,833,247 | A | * | 11/1998 | Deuschle et al. ............... 279/62 |
| 5,882,153 | A | * | 3/1999 | Mack et al. ................... 408/240 |
| 5,988,958 | A |   | 11/1999 | Mack |
| 6,488,286 | B2 | * | 12/2002 | Yaksich .......................... 279/62 |
| 6,517,295 | B2 | * | 2/2003 | Lin ................................ 408/16 |

(Continued)

FOREIGN PATENT DOCUMENTS

| CN | 1468158 | 1/2004 |
| DE | 19506708 C1 | 3/1996 |

(Continued)

*Primary Examiner* — Eric A Gates
*Assistant Examiner* — Paul M Janeski
(74) *Attorney, Agent, or Firm* — Kenyon & Kenyon LLP (57) ABSTRACT

The invention relates to a hand-held power tool with a tool clamping unit and an adjustment ring. The invention provides that the adjustment ring protrudes forwards in an axial direction beyond an axially rear end of the tool clamping unit, at least when the tool clamping unit is completely open. The invention further relates to an adjustment ring for a hand-held power tool.

24 Claims, 4 Drawing Sheets

(56) References Cited

U.S. PATENT DOCUMENTS

| | | | |
|---|---|---|---|
| 6,832,764 B2 * | 12/2004 | Steadings et al. | 279/62 |
| 7,018,146 B2 * | 3/2006 | Barton et al. | 408/240 |
| 7,481,608 B2 * | 1/2009 | Zhou et al. | 408/240 |
| 7,735,575 B2 * | 6/2010 | Trautner | 173/114 |
| 7,845,651 B2 * | 12/2010 | Yaksich | 279/62 |
| 7,896,356 B2 * | 3/2011 | Zhou et al. | 279/62 |
| 8,371,779 B2 * | 2/2013 | Steadings et al. | 408/240 |
| 2002/0020972 A1 | 2/2002 | Yaksich | |
| 2003/0075880 A1 * | 4/2003 | Girardeau | 279/137 |
| 2006/0118380 A1 * | 6/2006 | Aeberhard | 192/56.61 |
| 2006/0185866 A1 * | 8/2006 | Jung et al. | 173/48 |
| 2007/0137875 A1 * | 6/2007 | Spielmann | 173/216 |

FOREIGN PATENT DOCUMENTS

| | | |
|---|---|---|
| DE | 19802080 A1 | 7/1999 |
| GB | 2377193 B | 4/2003 |
| WO | 0216066 A1 | 2/2002 |

* cited by examiner

HAND-HELD POWER TOOL

CROSS-REFERENCE TO RELATED APPLICATION

This application is a 35 USC 371 application of PCT/EP2008/067065 filed on Dec. 9, 2008.

BACKGROUND OF THE INVENTION

1. Field of the Invention

The invention relates to a hand-held power tool and an adjusting ring for a hand-held power tool.

2. Description of the Prior Art

Hand-held power tools such as (cordless) screwdrivers, (cordless) drill/drivers, or (cordless) impact drills usually have a tool clamping unit embodied in the form of a chuck for clamping tools such as round-shank drill bits or hex-shank screwdriver bits. In addition, known hand-held power tools are typically equipped with a planetary shift transmission with a torque clutch; the torque clutch can be adjusted by means of an adjusting ring, which is situated adjacent to the chuck in the axial direction. As a first approximation, known hand-held power tools are usually embodied as L-shaped, with a handle at the back. Designs of this kind have the disadvantage that the overall length of the mechanical train limits the ability of the hand-held power tool to be used in tight spaces. In addition, the large overall length results in powerful holding moments that must be supported by the operator. The above-described L-shaped design has the advantage that the adjusting ring is easy to operate because the whole ring can be grasped.

According to a known, alternative embodiment, the handle is situated below the adjusting ring. Designs of this kind have the advantage that the tool weight has a less powerful impact on the holding moment to be exerted by the operator. The disadvantage is a limited accessibility to the adjusting ring for control purposes.

DE 195 06 708 C1 and DE 198 02 080 A1 have disclosed hand-held power drills in which the tool clamping unit embodied in the form of a chuck protrudes into a spindle housing in the axial direction. The hand-held power drills described therein are not equipped with an adjusting ring that is situated axially in relation to the chuck and provided for limiting the maximum torque to be exerted.

OBJECTS AND SUMMARY OF THE INVENTION

The object of the invention is to propose a hand-held power tool that is equipped with an adjusting ring and can be conveniently used in tight spaces. Another object of the invention is to propose an adjusting ring for a hand-held power tool that makes it possible to embody the hand-held power tool in such a way that it can be conveniently used even in tight spaces.

The invention is based on the recognition that in order to be able to conveniently use the hand-held power tool even in tight spaces, it is necessary to shorten its overall length. To shorten the overall length, the invention proposes to provide a cavity, in particular an annular one, radially inside the adjusting ring provided spaced apart from the front end of the hand-held power tool, in which cavity an axial rear end of the tool clamping unit can be accommodated. In other words, in the hand-held power tool embodied according to the concept of the invention, at least some of the time, the tool clamping unit is shifted further toward the rear, partway into the adjusting ring in order to thus reduce the overall length of the hand-held power tool, with the result that the hand-held power tool can be conveniently used even in tight spaces. Another advantage achieved by the invention lies in the fact that the holding moment that must be supported by the operator when working with the hand-held power tool is reduced due to the shortening of the hand-held tool, which is in particular L-shaped in the first approximation. Another advantage lies in the fact that the accommodation of part of the tool clamping unit in the adjusting ring and the placement of the front bearing point of the drive shaft at least partially inside the tool clamping unit results in a reduced tool eccentricity, thus improving the concentricity of the tool as a whole while retaining previously existing production tolerances for the tool clamping unit and the output shaft.

According to one advantageous modification of the invention, the axial rear end of the tool clamping unit, which the adjusting ring protrudes beyond in the axial direction toward the front—i.e. in the direction toward the free front end of the tool, is at least intermittently constituted by an outer adjusting sleeve of the tool clamping unit. By means of the adjusting sleeve, the tool clamping unit can be opened to insert or remove a tool and can be closed to fix a tool in position. For this purpose, the adjusting sleeve is preferably situated so that it can rotate in the circumference direction. Particularly preferably, an internal thread of the adjusting sleeve engages with an external thread of clamping jaws in order to move the latter. It is also conceivable for the tool clamping unit to be embodied in the form of a so-called quick-clamping chuck. The expression "rear end at least intermittently constituted by" should be understood in this context to mean that depending on the embodiment of the tool clamping unit, when the tool clamping unit is open, the rear end of the tool clamping unit can be intermittently constituted by another component of the tool clamping unit, in particular a clamping jaw, as explained in greater detail below. It is also possible to implement an embodiment in which the clamping jaw does not protrude beyond the adjusting sleeve in the axial direction toward the rear, even when the tool clamping unit is open. In this case, the axial rear end of the tool clamping unit is preferably permanently constituted by the adjusting sleeve or, as will be explained in greater detail below, by a ring element of the tool clamping unit that is static in the axial direction—i.e. cannot move axially—and preferably rotatable. In a preferred embodiment, the adjusting ring protrudes radially outward beyond the axial end of the tool clamping unit; it is also possible to implement an embodiment in which the adjusting ring protrudes axially into a region radially inside the outer boundary of the tool clamping unit.

As explained above, it is possible to implement an embodiment in which the rear end of the tool clamping unit situated axially toward the rear, which the adjusting ring protrudes beyond in the axial direction toward the front, is intermittently or permanently constituted by an immobile, i.e. static, ring element. It is preferable for an adjusting sleeve for controlling the tool clamping unit to be situated in front of the static ring element in the axial direction. In the above-described embodiment, with a ring element that is static in the axial direction and protrudes axially into the adjusting ring, and also in an embodiment in which the rear end of the tool clamping unit is constituted by an adjusting sleeve, preferably by an end surface of the adjusting sleeve, the resulting lower dust sensitivity of the hand-held power tool is particularly advantageous. The overlapping arrangement of the adjusting ring with the static ring element or with the adjusting sleeve hinders the penetration of dust into the transmission housing.

In a particularly preferred embodiment, the rear end of the tool clamping unit, which protrudes into the adjusting ring in the axial direction, is at least intermittently—particularly when a tool clamping unit is completely open—constituted by at least one movable clamping element, in particular a clamping jaw of the tool clamping unit. In this instance, it is preferable for the clamping jaw to protrude rearward in the axial direction beyond an adjusting sleeve and/or a static ring element of the tool clamping unit. It is possible in this case for the clamping jaw to constitute the axial rear end of the tool clamping unit either permanently, i.e. in every movement position, or only when the tool clamping unit is open; in this case, when the tool clamping unit is closed, the rear end is constituted by another component of the tool clamping unit, which component can end axially adjacent to the adjusting ring or preferably, protrudes into the adjusting ring in the axial direction.

In a particularly preferred embodiment, the axial rear end of the tool clamping unit, i.e. preferably an adjusting sleeve, a static ring element, and/or at least one clamping jaw, protrudes at least partway into a chamber that is open in the axial direction toward the front and is situated radially inside the outer circumference of the adjusting ring.

In a particularly advantageous embodiment, the chamber embodied inside the adjusting ring is delimited in the axial direction toward the rear by the adjusting ring, preferably by an annular wall oriented radially inward. Preferably, the annular wall extends radially inward to another component of the hand-held power tool, preferably to the transmission housing, preferably leaving a minimal guidance gap in order to also permit the adjusting ring to rotate around the output shaft in the circumference direction. The provision of the annular wall prevents or hinders the penetration of dirt into a region axially behind the annular wall where a torque clutch to be adjusted by means of the adjusting ring is preferably situated.

According to a modification of the invention, the annular wall, which is preferably of one piece with the adjusting ring that is in particular composed of plastic, is associated with an axial stop so that the annular wall, by cooperating with the axial stop, prevents a movement of the adjusting ring in at least one axial direction, preferably in the axial direction toward the front. In a particularly preferred embodiment, the axial stop is embodied in the form of a securing ring that is secured in form-locked fashion in a circumferential groove of the transmission housing.

In a suitable embodiment of the hand-held power tool, the adjusting ring is associated with a torque clutch; by rotating the adjusting ring in the circumference direction, the adjusting ring can be used to select between at least two maximum torques that can be transmitted by means of the tool clamping unit.

It is particularly preferable if the torque clutch is embodied so that it can be locked by means of the adjusting ring so that by means of the tool secured in the tool clamping unit, the transmission, which is in particular embodied in the form of a planetary gear set, is able to transmit the maximum torque produced.

In addition or alternative to the coupling of the adjusting ring to the torque clutch, in a modification of the invention, the adjusting ring can be used to adjust a transmission function. For example, according to one preferred embodiment, the adjusting ring can be used to activate or deactivate an impact drilling function in the event that the hand-held power tool is an impact drill, in particular one operated by means of a rechargeable battery.

For reasons of space optimization, it is advantageous if the front end of the transmission housing is accommodated in the tool clamping unit.

The invention also relates to an adjusting ring for a hand-held power tool. According to the invention, a cavity is provided radially inside the radially outer boundary of the adjusting ring, i.e. an inner cavity, which is embodied and situated so that an axial end of a tool clamping unit, which preferably can be detachably mounted onto the output shaft, can be accommodated in the cavity. Preferably, the cavity is a chamber, in particular an annular chamber, that is open toward the front in the axial direction and particularly preferably, is closed toward the rear in the axial direction by means of an annular wall, preferably in a region axially in front of a torque clutch. To avoid repetitions, with regard to possible advantageous embodiments of the adjusting ring, the reader is referred to the preceding description in which preferred exemplary embodiments of the adjusting ring are described in connection with the hand-held power tool.

BRIEF DESCRIPTION OF THE DRAWINGS

Other advantages, features, and details of the invention ensue from the following description of preferred embodiments, taken in conjunction with the drawings.

DESCRIPTION OF THE PREFERRED EMBODIMENTS

In the drawings, parts that are the same or function in the same manner have been labeled with the same reference numerals.

Figure 1:
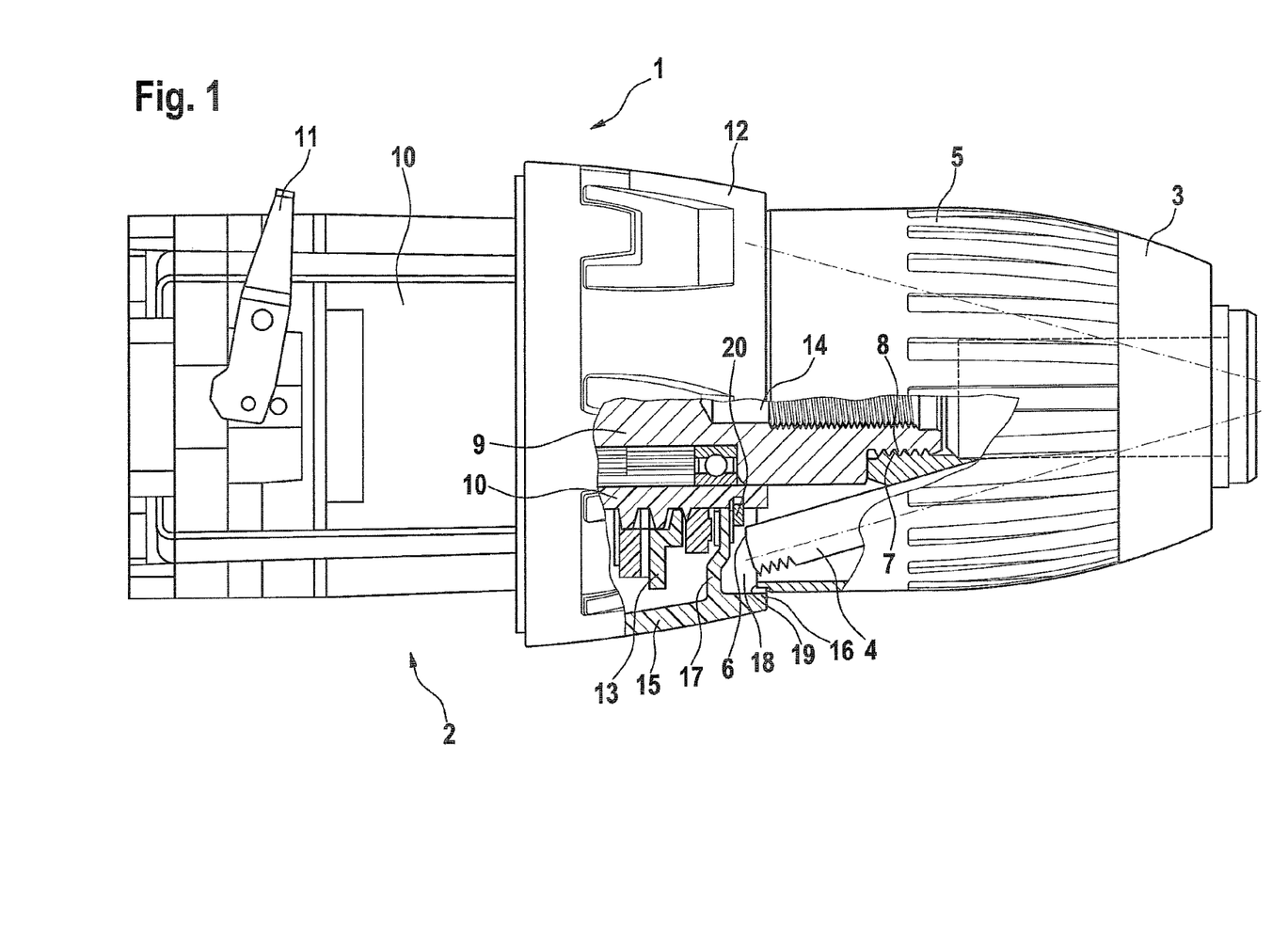
FIG. 1 shows a detail of a hand-held power tool equipped with a detachably mountable tool clamping unit, with the clamping unit completely open.

FIG. 1 shows an axial frontal region of a mechanical train 1 of a hand-held power tool 2. In the exemplary embodiment shown, the hand-held power tool 2, which is only partially depicted, is embodied as at least approximately L-shaped in an intrinsically known fashion, with the handle, not shown, extending essentially perpendicular to the mechanical train 1. The hand-held power tool 2 shown is a so-called drill/driver that can perform both screwdriving and drilling tasks. To do so, it is only necessary to mount the correct tool in a tool clamping unit 3 situated axially at the front.

The tool clamping unit 3 is a chuck equipped with three movable clamping jaws 4 arranged equidistantly from one another in the circumference direction, which can be moved in an intrinsically known fashion between an open position shown in FIG. 1 and a closed position (shown here without an insert tool) by rotating an adjusting sleeve 5 in the circumference direction. By contrast with known tool clamping units, the tool clamping unit 3 is dimensioned so that in the maximum open position shown in FIG. 1, the clamping jaw 4 protrudes rearward beyond the adjusting sleeve 5 in the axial direction. In the maximum open position of the tool clamping unit 3 shown in FIG. 1, the rear ends of the clamping jaws 4 thus constitute the rear end 6 of the tool clamping unit 3.

As can be inferred from FIG. 1, the tool clamping unit 3 is detachably screw-mounted with the aid of an integral internal thread section 7 to a front external thread section 8 of an output shaft 9 of a hand-held power tool 2; the output shaft 9 is connected in a torque-transmitting fashion to an electric drive motor, not shown, by means of a shift transmission, not shown, which is accommodated in a transmission housing 10 and is preferably embodied in the form of a planetary gear set. The transmission, not shown, is associated with a shifting lever 11 by means of which the transmission can be shifted between at least two transmission stages.

An adjusting ring 12 that extends around the output shaft 9 in the circumference direction is situated axially between the shifting lever 11 and the forward-most end of the hand-held power tool 2. The adjusting ring 12 is connected in an intrinsically known fashion to a radially inner torque clutch 13 so that the maximum transmittable torque can be adjusted by moving the adjusting ring 12, which is embodied in the form of an injection-molded part made of plastic in the exemplary embodiment shown. In the exemplary embodiment shown, the torque clutch 13 can also be locked with the aid of the adjusting ring 12, in particular for drilling tasks. As is also clear from FIG. 1, a blind hole bore 14, which is open toward the front and has an internal thread, is provided in the output shaft 9 to accommodate a fastening screw for mounting the tool clamping unit 3 in place.

As is also clear from FIG. 1, the adjusting ring 12 includes an outer, annular circumference wall 15 whose outer diameter tapers slightly toward the front. Spaced axially apart from the front end 16 of the circumference wall 15, an annular wall 17 branches off from the circumference wall 15 and extends, apart from a minimal gap, radially to the transmission housing 10, thus axially delimiting the rear end of a cavity, in this case a chamber 18 situated radially inside the circumference wall 15, and consequently protecting the torque clutch 13 from penetration by dirt.

In their maximum open position, the clamping jaws 4 protrude into the chamber 18 in the axial direction. In other words, the adjusting ring 12, in this case the circumference wall 15, protrudes forward in the axial direction beyond the axial rear end 6 of the tool clamping unit 3. Expressed in yet another way, the front end 16 (in this case the front end surface) of the adjusting ring 12 is situated in the axial direction in front of the axial rear end 6 (rear end surface of the clamping jaws 4), thus saving space and permitting the hand-held power tool to be conveniently used even in tight spaces. The rear end of the tool clamping unit 3 is situated behind the front end surface of the transmission housing 10.

As is also clear from FIG. 1, the front end of the adjusting ring 12 protrudes beyond not only the rear end of the clamping jaws 4 but also beyond the rear end surface 19 of the adjusting sleeve 5 of the tool clamping unit 3.

Figure 2:
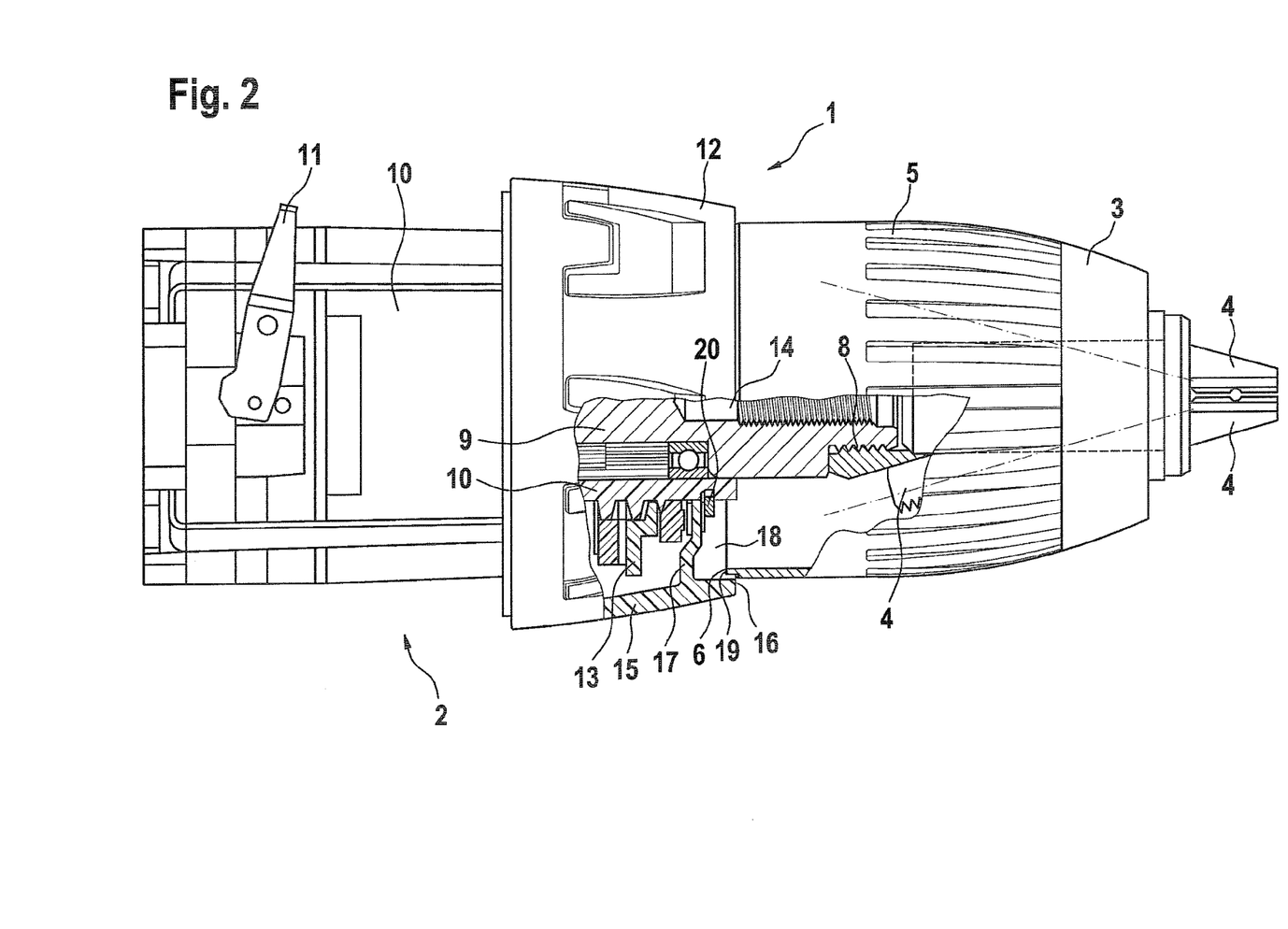
FIG. 2 shows the hand-held power tool according to FIG. 1, with the tool clamping unit completely closed.

It is clear from FIG. 2 that when the tool clamping unit 3 is completely closed, the clamping jaws 4 come to an end in front of the front end 16 of the adjusting ring 12 in the axial direction. In this adjustment position, the axial rear end 6 of the tool clamping unit 3 is constituted by the adjusting sleeve 5 or more precisely stated, by the rear end surface 19 of the adjusting sleeve 5. The front end 16 of the adjusting ring 12 protrudes forward in the axial direction beyond this rear end surface 19 of the adjusting sleeve 5, overlapping it on the radial outside. Alternatively, an embodiment can be implemented in which the adjusting ring 12 protrudes in the axial direction beyond the rear end surface 19, overlapping it on the radial inside.

As mentioned above, the annular wall 17 protrudes in the radial direction until nearly reaching the transmission housing 10, which radially adjoins the outside of the output shaft 9. Axially in front of the radially inner end region of the annular wall 17, an axial stop 20 embodied in the form of a securing ring is provided, which is secured in an external circumferential groove of the transmission housing 10. The stopping of the annular wall 17 against the axial stop 20 reliably prevents an axial movement of the adjusting ring 12 toward the front, past the position shown.

Other exemplary embodiments will be described below in conjunction with FIGS. 3 and 4. The discussion here will essentially concentrate on the differences in relation to the above-described exemplary embodiment; to avoid repetition with regard to common features, the reader is referred to the above description and to FIGS. 1 and 2.

Figure 3:
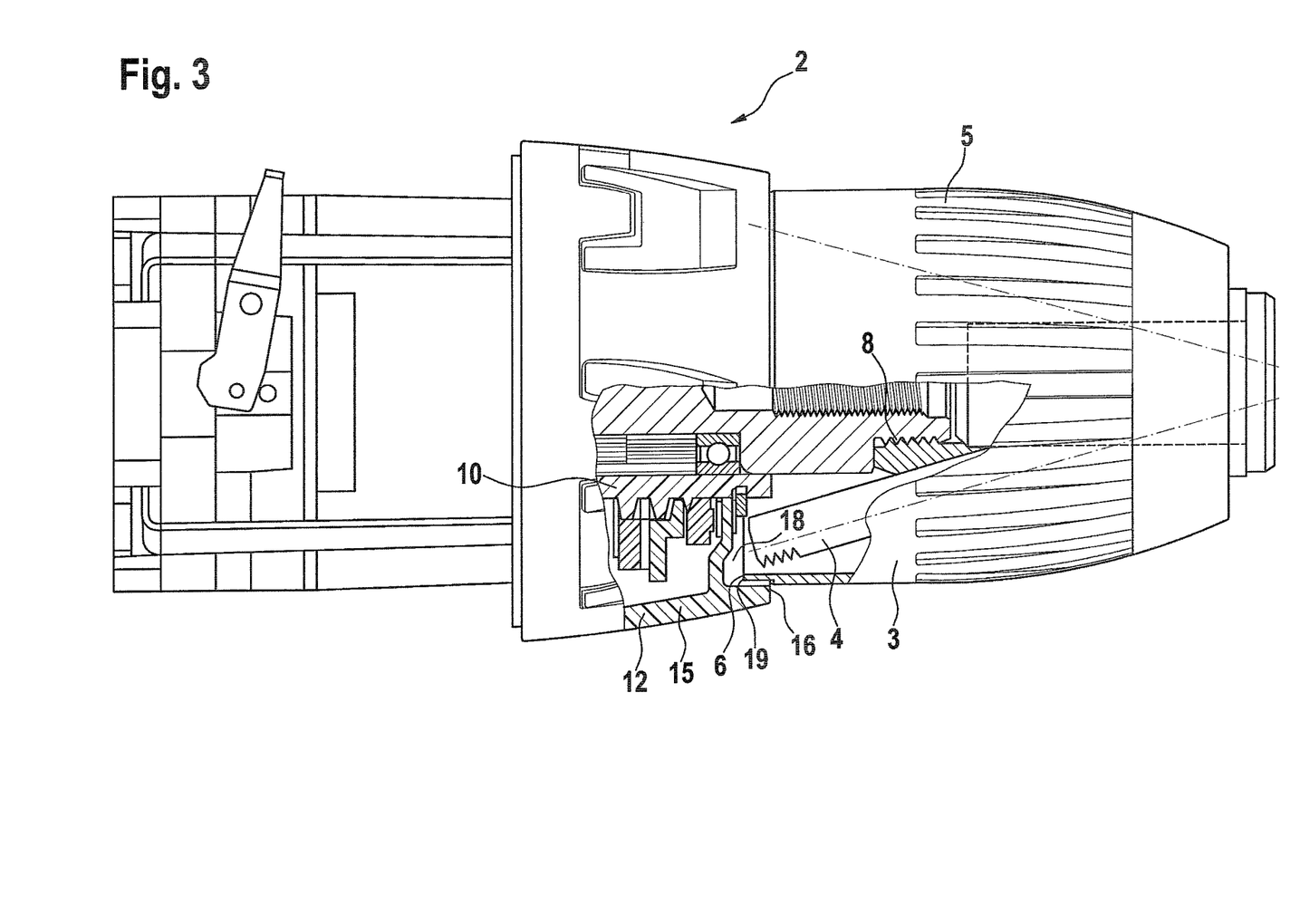
FIG. 3 shows a detail of a hand-held power tool equipped with a tool clamping unit that is long in the axial direction.

FIG. 3 shows a hand-held power tool 2 whose external threaded section 8 has a so-called long tool clamping unit 3 embodied in the form of a chuck mounted onto it. The tool clamping unit 3 once again includes three clamping jaws 4 that can be moved axially and radially at the same time with the aid of the adjusting sleeve 5. FIG. 3 shows the maximum open position of the tool clamping unit 3, i.e. the rear-most movement position of the clamping jaws 4. It is clear that the adjusting sleeve 5 protrudes rearward beyond the rear end of the clamping jaws 4 in the axial direction. The axial rear end 6 of the tool clamping unit 3 is therefore permanently constituted by the rear end surface 19 of the adjusting sleeve 5 and is at no time constituted by the clamping jaws 4. As is clear from FIG. 3, the adjusting ring 12, or more precisely stated the front end 16 of the adjusting ring 12, protrudes forward in the axial direction beyond the rear end 6 of the tool clamping unit 3, or more precisely stated the rear end surface 19 of the adjusting sleeve 5, and the adjusting sleeve 5 encompasses the front end of the transmission housing 10. As a result, the rear section of the adjusting sleeve 5 is situated in the chamber 18 radially inside the circumference wall 15 of the adjusting ring 12. The chamber 18 is embodied in the same way as in the exemplary embodiment according to FIGS. 1 and 2.

Figure 4:
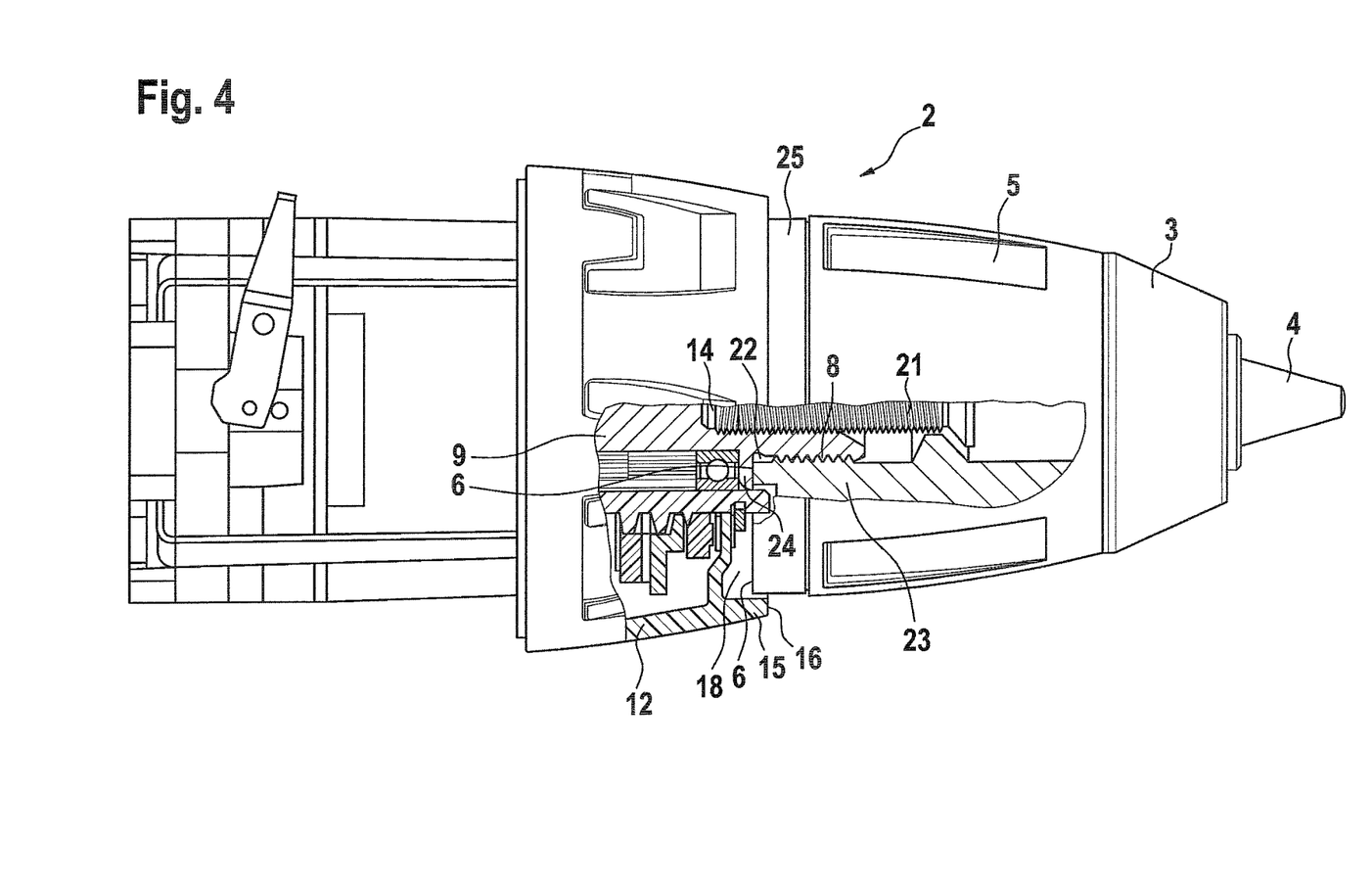
FIG. 4 shows a detail of a hand-held power tool equipped with a so-called standard tool clamping unit.

FIG. 4 shows another exemplary embodiment of a hand-held power tool 2. This tool is equipped with a tool clamping unit 3 embodied in the form of a standard chuck. This chuck includes an adjusting sleeve 5 that can be moved in the circumference direction in order to move clamping jaws 4. The tool clamping unit 3 is mounted onto the output shaft 9 not with the aid of an integral internal thread section, but with the aid of a separate fastening screw 21; the fastening screw 21 is screwed into the internal thread of the central blind hole bore 14. The external thread section 8 of the output shaft 9 is encompassed by an inner sleeve section 23 whose end surface rests against a circumferential collar 24 of the output shaft 9. A ring element 25, which is static in the axial direction and rotates during operation, is situated axially adjacent to the adjusting sleeve 5, behind the adjusting sleeve 5, and is not used for moving the clamping jaws 4. The rear end surface of the ring element 25, together with the rear end surface of the inner sleeve section 23, constitutes the axial rear end 6 of the tool clamping unit 3; in the exemplary embodiment according to FIG. 4 as well, the adjusting ring 12, or more precisely stated the circumference wall 15, and the front end 16 of the circumference wall 15 protrude forward in the axial direction beyond the axial rear end 6 of the tool clamping unit 3, i.e. the rear end constituted by both the rear end of the sleeve section 23 and the rear end of the ring element 25. Likewise, the front end surface of the transmission housing 10 is situated inside the tool clamping unit 3.

As is also clear from FIG. 4, the axial rear end of the ring element 25 is situated in the chamber 18, whereas the axial rear end of the sleeve section 23 is situated in a front recess 22 that is delimited in the axial direction toward the rear by the circumferential collar 24 of the output shaft 9. The recess 22 is delimited by the output shaft 9 in the radial direction toward the inside and is delimited by the transmission housing 10 in the radial direction toward the outside. The recess 22 is situated radially inside the circumferential wall 15 of the adjusting ring 12.

The foregoing relates to the preferred exemplary embodiments of the invention, it being understood that other variants and embodiments thereof are possible within the spirit and scope of the invention, the latter being defined by the appended claims.

The invention claimed is:

1. A hand-held power tool comprising:
   a transmission housing;
   a tool clamping unit having a plurality of clamping jaws and an adjusting sleeve; and
   a rotatable torque-adjusting ring configured to adjust a torque clutch, the torque-adjusting ring including a first end in a first plane that is at a first axial position and a second end that is in a second plane that is at a second axial position,
   wherein the torque clutch includes an element that is arranged on the transmission housing and the torque-adjusting ring is connected to the element of the torque clutch such that the maximum transmittable torque can be adjusted by the torque-adjusting ring,
   wherein at least when the tool clamping unit is in a completely open position, an axial rear end of the clamping jaws is, with respect to an axial direction, rearward of the first plane and the second plane is, with respect to the axial direction, rearward of the axial rear end of the tool clamping unit,
   wherein the axial rear end of the clamping jaws is accommodated in a chamber that is:
      open in the axial direction toward a front thereof;
      delimited in a radial direction toward an outside thereof by the adjusting ring; and
      delimited axially toward a rear thereof by an annular wall of the adjusting ring that extends radially inward, the annular wall being positioned, with respect to the axial direction, rearward of an axial forward end of the transmission housing,
      wherein an axial stop embodied in the form of a securing ring is provided with respect to the axial direction, rearward of the first plane, and prevents an axial movement of the adjusting ring past the axial stop.

2. The hand-held power tool as recited in claim 1, wherein the axial rear end of the tool clamping unit, which the adjusting ring protrudes beyond in the axial direction toward a front thereof, is embodied by the adjusting sleeve of the tool clamping unit.

3. The hand-held power tool as recited in claim 2, wherein the axial rear end of the tool clamping unit, which the adjusting ring protrudes beyond in the axial direction toward the front thereof, is embodied by at least one of the plurality of clamping jaws, at least when the tool clamping unit is in the completely open position.

4. The hand-held power tool as recited in claim 2, wherein the axial rear end of the tool clamping unit is situated radially between the adjusting ring and an output shaft.

5. The hand-held power tool as recited in claim 4, wherein the axial rear end of the tool clamping unit is situated radially between the adjusting ring and a transmission housing.

6. The hand-held power tool as recited in claim 1, wherein the axial rear end of the tool clamping unit, which the adjusting ring protrudes beyond in the axial direction toward a front thereof, is embodied by a ring element that belongs to the tool clamping unit and is static in the axial direction.

7. The hand-held power tool as recited in claim 6, wherein the axial rear end of the tool clamping unit, which the adjusting ring protrudes beyond in the axial direction toward the front thereof, is embodied by at least one of the plurality of clamping jaws, at least when the tool clamping unit is in the completely open position.

8. The hand-held power tool as recited in claim 6, wherein the axial rear end of the tool clamping unit is situated radially between the adjusting ring and an output shaft.

9. The hand-held power tool as recited in claim 8, wherein the axial rear end of the tool clamping unit is situated radially between the adjusting ring and a transmission housing.

10. The hand-held power tool as recited in claim 1, wherein the axial rear end of the tool clamping unit, which the adjusting ring protrudes beyond in the axial direction toward the front thereof, is embodied by at least one of the plurality of clamping jaws, at least when the tool clamping unit is in the completely open position.

11. The hand-held power tool as recited in claim 1, wherein the axial rear end of the tool clamping unit is situated radially between the adjusting ring and an output shaft.

12. The hand-held power tool as recited in claim 11, wherein the axial rear end of the tool clamping unit is situated radially between the adjusting ring and a transmission housing.

13. The hand-held power tool as recited in claim 1, wherein the securing ring is situated on a transmission housing.

14. The hand-held power tool as recited in claim 1, wherein a front end surface of a transmission housing protrudes axially into the tool clamping unit.

15. An adjusting ring for a hand-held power tool, as recited in claim 1, characterized in that a cavity, in particular a chamber that is open in the axial direction toward a front thereof, is provided in the adjusting ring to accommodate a rear end of a tool clamping unit, which is preferably detachably mountable.

16. The hand-held power tool as defined in claim 1, wherein the axial forward end of the transmission housing is disposed substantially in the first plane.

17. The hand-held power tool as defined in claim 1, wherein the axial rear end of the clamping jaws is, with respect to an axial direction, rearward of an axial rear end of the adjusting sleeve of the clamping unit.

18. A hand-held power tool comprising:
   a transmission housing;
   a tool clamping unit; and
   a rotatable torque-adjusting ring configured to adjust a torque clutch, the torque-adjusting ring including a first end in a first plane that is at a first axial position and a second end that is in a second plane that is at a second axial position,
   wherein the torque clutch includes an element that is arranged on the transmission housing and the torque-adjusting ring is connected to the element of the torque clutch such that the maximum transmittable torque can be adjusted by the torque-adjusting ring,
   wherein, at least when the tool clamping unit is in a completely open position, an axial rear end of the clamping jaws is, with respect to an axial direction, rearward of the first plane and an axial forward end of the transmission housing is disposed substantially in the first plane,
   wherein the axial rear end of the clamping jaws is accommodated in a chamber that is:
      open in the axial direction toward a front thereof;
      delimited in a radial direction toward an outside thereof by the adjusting ring; and
      delimited axially toward a rear thereof by an annular wall of the adjusting ring that extends radially inward, the annular wall being positioned, with respect to the axial direction, rearward of an axial forward end of the transmission housing, wherein an axial stop embodied in the form of a securing ring is provided with respect to the axial direction, rearward of the first plane, and prevents an axial movement of the adjusting ring past the axial stop.

19. A hand-held power tool comprising:

a transmission housing;

a tool clamping unit having a plurality of clamping jaws and an adjusting sleeve; and a rotatable torque-adjusting ring configured to adjust a torque clutch, the torque-adjusting ring including a first end in a first plane that is at a first axial position and a second end that is in a second plane that is at a second axial position, wherein the torque clutch includes an element that is arranged on the transmission housing and the torque-adjusting ring is connected to the element of the torque clutch such that the maximum transmittable torque can be adjusted by the torque-adjusting ring, wherein, at least when the tool clamping unit is in a completely open position, an axial rear end of the adjusting sleeve of the tool clamping unit is, with respect to an axial direction, rearward of an axial rear end of the clamping jaws and rearward of the first plane, and the second plane is, with respect to the axial direction, rearward of the axial rear end of the tool clamping unit, wherein the axial rear end of the clamping jaws is accommodated in a chamber that is:
open in the axial direction toward a front thereof;
delimited in a radial direction toward an outside thereof by the adjusting ring; and
delimited axially toward a rear thereof by an annular wall of the adjusting ring that extends radially inward, the annular wall being positioned, with respect to the axial direction, rearward of an axial forward end of the transmission housing, wherein an axial stop embodied in the form of a securing ring is provided with respect to the axial direction, rearward of the first plane, and prevents an axial movement of the adjusting ring past the axial stop.

20. The hand-held power tool as defined in claim 19, further comprising a transmission housing, wherein an axial forward end of the transmission housing is disposed substantially in the first plane.

21. A hand-held power tool comprising:

a transmission housing;

a tool clamping unit having a plurality of clamping jaws, an adjusting sleeve and a ring element; and a rotatable torque-adjusting ring configured to adjust a torque clutch, the torque-adjusting ring including a first end in a first plane that is at a first axial position and a second end that is in a second plane that is at a second axial position, wherein the torque clutch includes an element that is arranged on the transmission housing and the torque-adjusting ring is connected to the element of the torque clutch such that the maximum transmittable torque can be adjusted by the torque-adjusting ring, wherein, at least when the tool clamping unit is in a completely open position, an axial rear end of the ring element of the tool clamping unit is, with respect to an axial direction, rearward of the first plane, and the second plane is, with respect to the axial direction, rearward of the axial rear end of the tool clamping unit, wherein the axial rear end of the clamping jaws is accommodated in a chamber that is:
open in the axial direction toward a front thereof;
delimited in a radial direction toward an outside thereof by the adjusting ring; and
delimited axially toward a rear thereof by an annular wall of the adjusting ring that extends radially inward, the annular wall being positioned, with respect to the axial direction, rearward of an axial forward end of the transmission housing, wherein an axial stop embodied in the form of a securing ring is provided with respect to the axial direction, rearward of the first plane, and prevents an axial movement of the adjusting ring past the axial stop.

22. The hand-held power tool as defined in claim 21, wherein the axial rear end of the ring element is, with respect to an axial direction, rearward of an axial rear end of the clamping jaws.

23. The hand-held power tool as defined in claim 21, wherein the axial rear end of the ring element is, with respect to an axial direction, rearward of an axial rear end of the adjusting sleeve.

24. The hand-held power tool as defined in claim 21, further comprising a transmission housing, wherein an axial forward end of the transmission housing is disposed substantially in the first plane.

* * * * *